April 19, 1938.    F. R. WEST    2,114,642
METHOD AND APPARATUS FOR ACCELERATING THE PRODUCTION OF FROZEN ARTICLES
Original Filed Nov. 13, 1931
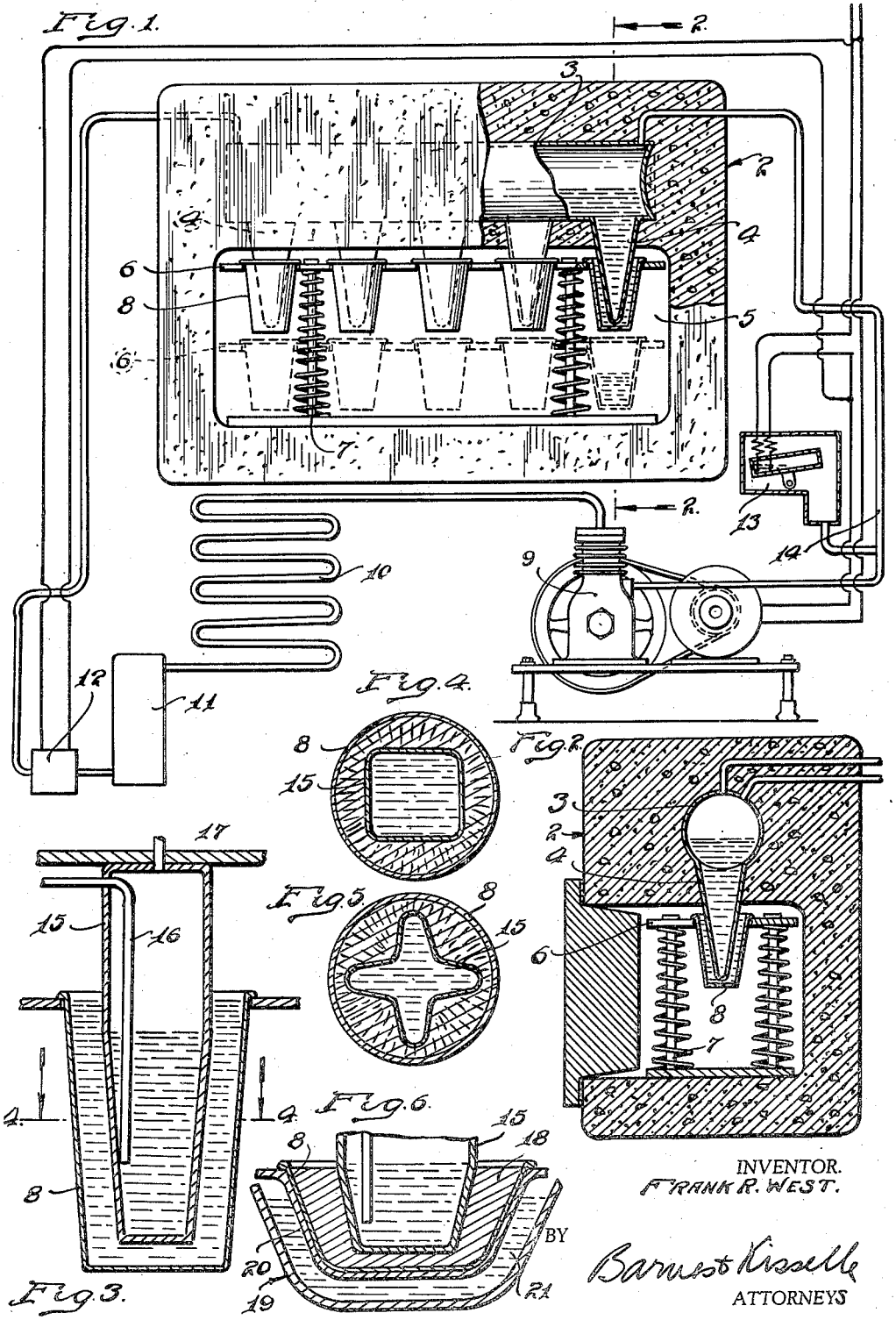
INVENTOR.
FRANK R. WEST.
BY
Barnest Kisselle
ATTORNEYS Patented Apr. 19, 1938

2,114,642

UNITED STATES PATENT OFFICE 2,114,642

METHOD AND APPARATUS FOR ACCELERATING THE PRODUCTION OF FROZEN ARTICLES

Frank R. West, Detroit, Mich., assignor, by mesne assignments, to Nash-Kelvinator Corporation, Detroit, Mich., a corporation of Maryland Application November 13, 1931, Serial No. 574,726
Renewed March 15, 1937

9 Claims. (Cl. 62—108.5)

This invention relates to a method and apparatus for accelerating the production of frozen articles, and has to do particularly with an extremely simple, inexpensive manner of freezing substances as a matter of seconds or a few minutes at the most and the release of the frozen articles from the freezing means at will.

It is the object of the present invention to provide a refrigerating system, the sharp freezing part of which is adapted to primarily freeze by direct immersion in the substance to be frozen; the refrigerating system itself being arranged to manually or automatically cause release of the frozen substance or article from the sharp freezing unit by the adding of a fresh and warm supply of refrigerating medium to the cooling unit. In carrying out this method I make use broadly of the impulse system of refrigeration as disclosed in my copending application No. 407,306, filed November 15, 1929, Patent No. 2,051,664, issued August 18, 1936, in that the impulses of warm refrigerant are used for the freeing of the quickly frozen articles.

An important feature in carrying out the preferred method steps of this invention is the freezing of the substance in the container in which it is to be served. Still another feature is the design and arrangement of the sharp freezing member relative to the shape of the container for the substance to be frozen whereby the substance is frozen so fast that substantially all the ingredients of such substance are frozen at the same time. The direct result of this is that all substances frozen by this method are smooth in texture as compared to roughness heretofore experienced in direct freezing of this type.

Other novel steps of the method and detailed structural characteristics of the apparatus will be more clearly brought out in the specification and claims.

In the drawing:

Fig. 1 is a somewhat diagrammatic view of a complete refrigerating system for carrying out the steps of my quick freezing method.

Fig. 2 is a sectional view taken on line 2—2 of Fig. 1.

Fig. 3 is a sectional view of a modified form of the invention wherein substantially all the refrigerating effect takes place within the substance to be frozen.

Fig. 4 is a modified sectional view taken on line 4—4 of Fig. 3 and illustrating a possible change in the cross sectional shape of the sharp freezing member.

Fig. 5 is a sectional view similar to Fig. 4 illustrating a further modified change in the cross sectional shape of the freezing unit.

Fig. 6 illustrates a further modified manner of carrying out my step of fast freezing wherein the sharp freezing action takes place from both the inside and outside of the substances to be frozen.

In all preferred forms of apparatus for carrying out my method, the refrigerant is immersed in the substance to be cooled so that the substance and the refrigerant are separated only by the container wall. In order to effect rapid freezing the arrangement is such that a relatively thin wall of substance surrounds the sharp freezing element and the refrigerant within the element is caused to evaporate with more or less rapidity so as to cause immediate freezing of the substance. Once frozen the recharging of the sharp freezing unit with fresh refrigerant will cause an almost instantaneous heating up of the freezing unit so as to permit quick and easy release of the frozen article and its container.

The general method of carrying out the invention may be best illustrated by describing the operation of the structure shown in Fig. 1. The cooling unit proper may be illustrated as at 2 and a suitable evaporator 3 positioned therein. The evaporator 3 may be provided with a plurality of sharp freezing units 4 adapted to receive and contain a portion of the refrigerant.

In the form shown in Fig. 1 these sharp freezing units 4 are stationary and project down into the sharp freezing chamber 5. A plate 6 mounted on relatively light springs 7 is adapted to receive a plurality of containers 8. The plate 6 is adapted to be moved from full line position to dotted line position, as shown in Fig. 1 and is also adapted to receive the containers 8 individually or to slide as a unit entirely from the sharp freezing chamber with all the container units carried thereby. In operation the containers are preferably filled with a predetermined amount of liquid to be frozen and the plate with the containers positioned therein allowed to move upwardly into the full line position shown in Fig. 1. The compressor 9 may then be started and evaporation of the refrigerant within the evaporator 3 will cause rapid freezing of the contents of the containers because of the direct heat conductivity between the sharp freezing members 4 and the substance to be frozen. During this freezing action and during the operation of the compressor the refrigerant will be condensed in the condenser 10 and accumulated in the receiver 11. During the running period of the compressor the control valve diagrammatically indicated as at 12 is closed. As soon as the article or articles are sufficiently frozen, the valve 12 may be opened manually or automatically to allow the charge of refrigerant collected in the receiver 11 to pass over into the cooling unit. This relatively warm refrigerant going over into the cooling unit immediately equalizes at high pressure and the temperature in the cooling unit will rise immediately to above 32° F., whereby the frozen substance within the container 8 may be readily detached.

The compressor and the valve 12 may be operated manually if desired, or completely automatic. In one instance, a pressure temperature thermostat 13 could be located in the return conduit 14 and this thermostat so wired up, as shown in Fig. 1, as to simultaneously control the operation of the motor and the valve 12. In other words, actuation of the valve 13 by connecting the unit into the electrical system whereby a rise in temperature will start the compressor and close the switch and upon lowering the pressure to a sufficient extent to obtain the desired temperature, the thermostat will stop the motor and open the switch. In this case the switch 12 is of the solenoid type, electrically held shut but spring opened. In this way the quick freezing of the substance within each container may be controlled automatically, the operator knowing that when the motor is stopped in the next few seconds the frozen substance may be readily detached from the freezing units, or the freezing and heating action may be controlled entirely by the operator.

In Fig. 3 I have shown a slightly modified form wherein the freezing unit 15 is of the individual type and the height of the liquid within the unit is somewhere near the top of the container 8. The intake for the refrigerant may be indicated as at 16 and the outlet as at 17. Such a unit as illustrated in Fig. 3 is very readily adapted for freezing water, as I have found it possible to freeze a layer of ice around the sides of a standard eight ounce container in approximately fifty-five seconds, after which the container and its layer of ice and the hollow center are filled with water to give a very cool drink. I have found it practical to use a container formed of material other than glass, such as waxed paper and the like, as the rapid freezing and expansion of the liquid readily cracks glass containers. The containers 8, as used in my process, are also preferably formed of a material which will not readily stick to the metal plate 6 during the freezing step. During operation the heat from the surge of fresh refrigerant will serve to release the sharp freezing members from the frozen substance but will not materially change the temperature of the plate 6. In freezing milk, sherbets, and similar substances, the freezing action is so fast that upon breaking the frozen substance the grain is radial to the vertical axis through the container. Sherbets and milk are frozen so rapidly that the sugar has no chance to deposit from the original solution.

In Fig. 4 I have shown a freezing unit slightly modified in cross sectional shape as compared with the circular unit shown in Fig. 3, and in Fig. 5 I have shown a modified cross sectional shape to provide greater surface area and also provide more room for the substance to be frozen.

In Fig. 6 I have illustrated a modified arrangement wherein the container 8 is somewhat shorter than as shown in Fig. 3 and wherein means is provided for freezing the substance 18 within the container both from the inside and the outside. For this purpose I have provided a sharp freezing unit 19 the inner wall 20 of which is preferably shaped corresponding to the shape of the container 8. When such apparatus is used with the flooded system, the level of the liquid within the freezing unit 15 is preferably somewhat nearer the top of the container 8 and the level of the refrigerant 21 in the freezing unit 19 is preferably maintained somewhere near the top of such unit 19. In this manner it will be obvious that the substance 18 will be located in a zone of extremely intense heat transfer. By freezing the substance both from the inside and the outside, it will be obvious that a measurably thicker wall of substance may be frozen without materially changing the intense freezing action, whereas if an extremely thick wall of substance were attempted to be frozen by the unit as shown in Fig. 3, it is quite probable that the substance adjacent the freezing unit will be fast frozen while the substance adjacent the outer edge and somewhat distant from the freezing unit will freeze considerably slower, with the result that in the case of freezing sherbets, for instance, the sugar might have a chance to spread. In such a product the inside of the frozen unit would be smooth while the outside would probably tend to a slight coarseness. By freezing the substance from the outside as well as the inside such tendency to coarseness is practically eliminated.

The novel shape of the product of the present invention is beneficial in many ways; in case of freezing plain water the wall of ice permits filling the container with water in the center and the greater surface area will more quickly cool the water than would be the case with freely floating ice cubes or blocks; in freezing sherbets, ice creams, or puddings, it will be seen that the center hollow portion may be given various shapes and may be filled with other ingredients such as whipped cream.

It will be understood that the refrigerating system disclosed is only one of many possible systems for carrying out my method and producing the product, the main feature being the freezing of substances around and the release from the sharp freezing member by the flow of heat units in opposite directions. It is obvious that warm brine, electric resistance means, or any other combination may be used as a part of the sharp freezing members to permit easy release of the frozen articles.

What I claim is:

1. The method of freezing which consists in placing a relatively small quantity of an edible substance or the like to be frozen within a dispensing container, immersing a sharp freezing member within the substance to be frozen to displace the same around the walls of the container and simultaneously subjecting the inside and outside walls of said substance to a sharp freezing action as a step in a volatile refrigerant cycle, and then raising the temperature of at least one of said sharp freezing members as a condition precedent to the next freezing step to permit easy release of the frozen article.

2. The method of freezing and releasing substances in a single refrigerant cycle, which consists in placing a quantity of the substance to be frozen within a container, immersing a sharp freezing member within the substance to be frozen to displace the same around the walls of the container, simultaneously subjecting the inside and outside walls of said substance to a sharp freezing action as a step in said cycle, and then raising the temperature of at least one of said sharp freezing members by subjecting same to a surge of compressed volatile refrigerant to permit easy release of the frozen article and its container.

3. The method of freezing and releasing substances in a single refrigerant cycle, which consists in placing a quantity of the substance to be frozen within a container, immersing a sharp freezing member within the substance to be frozen to displace the same around the walls of the container, simultaneously subjecting the inside and outside walls of said substance to a sharp freezing action as a step in said cycle, and then raising the temperature of at least one of said sharp freezing members by subjecting same to a surge of compressed volatile refrigerant to permit easy release of the frozen article and its dispensing container.

4. Sharp freezing structure for fast freezing relatively small quantities of edible substances within individual dispensing containers to be served to consumers, comprising one or more sharp freezing members containing refrigerant and complementally shaped relative to each individual container to fit within the same, means for positioning each container and its corresponding sharp freezing member so that the sharp freezing member is immersed within the substance within the container whereby to form a wall of frozen substance around the inside of the container, and means for supplying a fresh charge of refrigerant to said sharp freezing members immediately after the freezing of said substance to effect release of said members from the frozen substance.

5. The method of freezing, which consists in placing a quantity of substance to be frozen within a container, immersing a sharp freezing member within the substance to be frozen to displace the same around the walls of the container and simultaneously subjecting the inside and outside walls of said substance to a sharp freezing action as a step in a refrigerant cycle, and then subjecting said walls to a fresh surge of compressed volatile refrigerant as a step in the same cycle to raise the temperature thereof and assist in releasing the frozen substance from the container.

6. The method of fast freezing relatively small quantities of edible substances within individual dispensing containers of the type served directly to consumers, which comprises providing one or more sharp freezing members adapted to contain a volatile refrigerant and so shaped relative to each individual container as to loosely fit within the same, filling said containers with a predetermined amount of edible substance, effecting relative positioning between each container and its corresponding sharp freezing member so that the sharp freezing member is immersed within and forces the substance up between the sharp freezing member and the wall of the container freezing a wall of frozen substance around the inside of the container, and then supplying a fresh charge of refrigerant to said sharp freezing member or members immediately after the freezing of said substance to effect release of said members from the frozen substance.

7. Refrigerating apparatus comprising, sharp freezing evaporating means arranged to simultaneously freeze a plurality of individual blocks of edible material by actual contact of said edible material with said evaporating means, means for controlling refrigeration in said evaporating means and the freezing and release of said blocks from said evaporating means including a refrigerant flow control valve and temperature responsive means for controlling the operation of said valve to either cause refrigeration in said evaporating means or to temporarily interrupt refrigeration therein.

8. Refrigerating apparatus comprising, sharp freezing evaporating means arranged to simultaneously freeze a plurality of individual blocks of edible material by contact directly between the edible material and the evaporating means, means for controlling refrigeration in said evaporating means and the freezing and release of said blocks from said evaporating means and temperature responsive means for controlling said controlling means.

9. Refrigerating apparatus comprising, in combination, a cooling unit completely enclosing a space, a refrigerant evaporating element having a plurality of refrigerated projections for simultaneously freezing individual blocks of edible material directly to said projections, said projections extending into said space, means within said space for supporting said material to be frozen and thermostatic means for periodically freeing the frozen blocks for ready removal from said space.

FRANK R. WEST.